May 30, 1933.                N. BARMAKIAN                1,911,786
                MACHINE FOR MAKING BREAD OR CRACKERS
                   Original Filed May 15, 1929    3 Sheets-Sheet 1

Inventor
                                      Napoleon Barmakian
                                      by Heard Smith & Tennant.
                                                   Attys

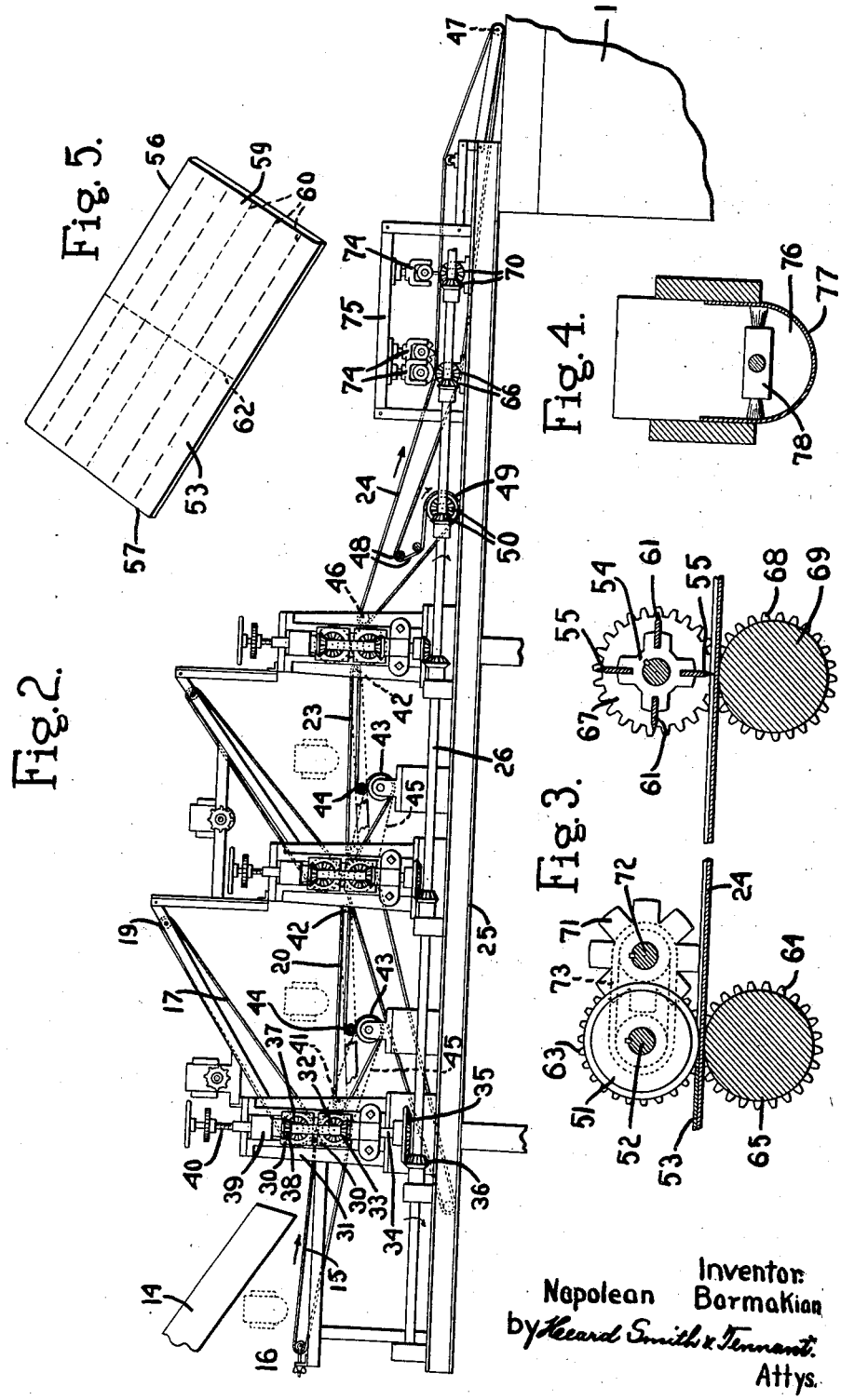

May 30, 1933.   N. BARMAKIAN   1,911,786
MACHINE FOR MAKING BREAD OR CRACKERS
Original Filed May 15, 1929   3 Sheets-Sheet 3
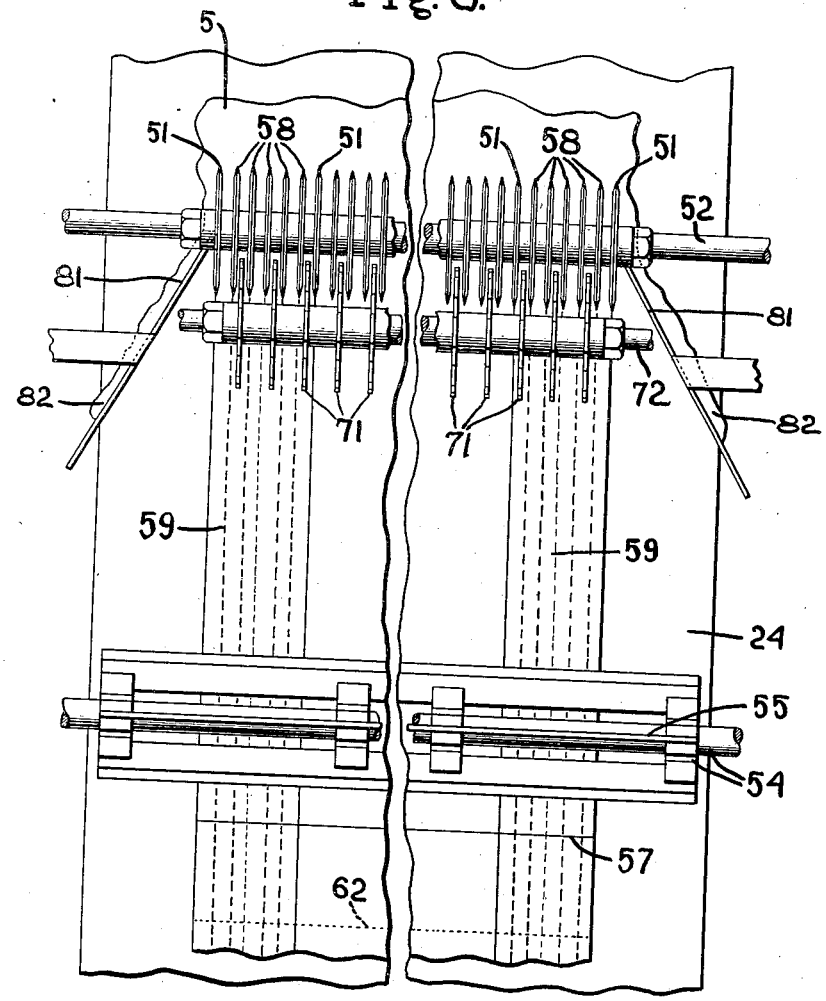
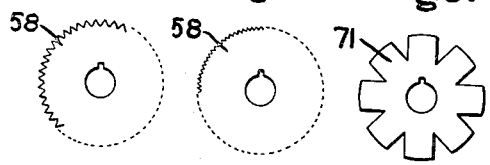
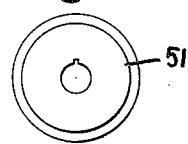
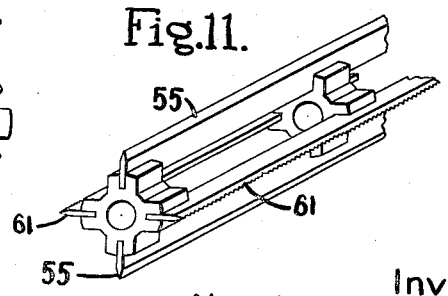
Inventor
Napoleon Barmakian
by Heard Smith & Tennant
Attys.

Patented May 30, 1933　　　　　　　　　　　　　　　　1,911,786

UNITED STATES PATENT OFFICE

NAPOLEON BARMAKIAN, OF BOSTON, MASSACHUSETTS, ASSIGNOR TO KRIKOR BARMAKIAN, OF OAK BLUFFS, MASSACHUSETTS

MACHINE FOR MAKING BREAD OR CRACKERS

Application filed May 15, 1929, Serial No. 363,179. Renewed August 9, 1932.

This invention relates to a machine for making bread and has for its general object to provide a novel machine which is constructed to manipulate the dough and automatically divide it into portions of the desired size and then to deliver these portions automatically to the oven in which the bread is baked, the machine being constructed to automatically deliver the baked bread from the oven. The operation is a continuous and automatic one so that all the operator has to do is to see that the machine is properly supplied with dough, the whole operation of manipulating the dough, dividing it, delivering it to and carrying it through the oven, being automatic. There is, therefore, no handling of the dough during the process.

In order to give an understanding of the invention I have illustrated in the drawings a selected embodiment thereof which will now be described after which the novel features will be pointed out in the appended claims.

Fig. 1 of the drawings is a more or less diagrammatic view illustrating the machine embodying my invention;

Fig. 2 is an enlarged view of the part of the mechanism which works the dough into sheet formation and divides the dough preparatory to delivering it to the oven;

Fig. 3 is a sectional view illustrating the divider;

Fig. 4 is a sectional view of a device for dusting flour on the travelling belts;

Fig. 5 is a fragmentary view illustrating the bread which is made with this machine;

Fig. 6 is a plan view partly broken out illustrating the divider;

Figs. 7 and 8 are views illustrating different forms of marking wheels which may be employed;

Fig. 9 is a view of the stripper wheel which is associated with the marking wheels;

Fig. 10 is a view of one of the cutters for cutting the sheet of dough longitudinally;

Fig. 11 is a perspective view of the cutter and marker for cutting the sheet of dough transversely.

Figure 1:
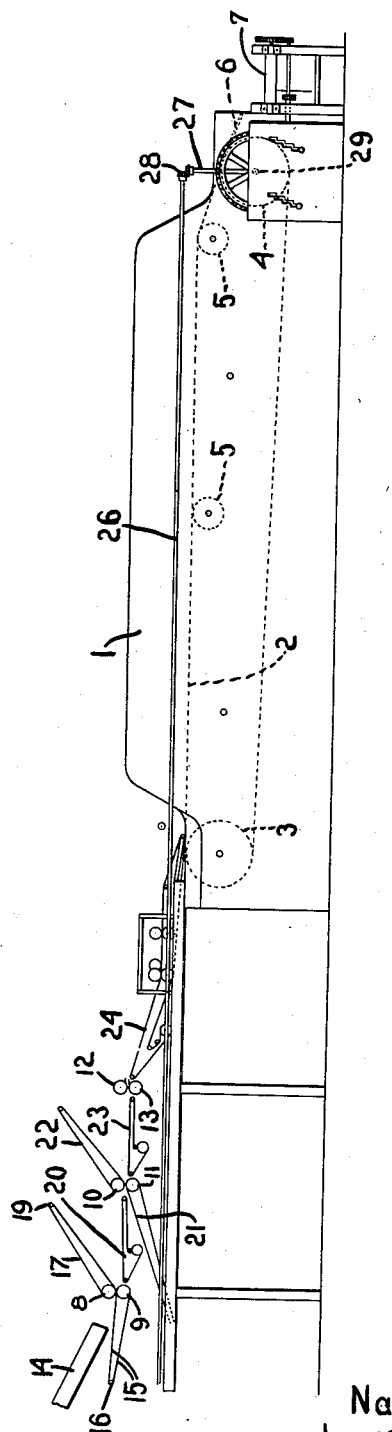

The machine herein shown is specially designed for making so-called "wafer" bread, which is bread baked in relatively thin sheets and properly marked and cut so that it can be broken into rectangular units. The machine comprises a plurality of pairs of presser rolls between which the dough is fed successively, these rolls serving to roll the dough out into the form of a sheet of the required thickness. It also comprises an oven through which the sheet of dough is carried in which it is baked and a dividing mechanism arranged to act on the sheet of dough before it is delivered to the oven and to cut it both longitudinally and transversely into units of the desired size. This divider will also preferably be provided with means to mark or score the units so that they may be easily broken.

In the drawings the oven in which the bread is baked is indicated generally at 1. This may be of any suitable construction and may be heated in any desirable way. It is shown as an elongated oven chamber having within it an endless carrier 2 extending from the inlet end (which is the left hand end Fig. 1) to the discharge end (which is the right hand end Fig. 1). The endless carrier 2 receives the divided dough at the inlet end and carries the dough through the oven, the movement of the endless carrier and the temperature of the oven being so adjusted that the bread will be properly baked by the time it reaches the discharge end of the oven.

The endless carrier 2 is shown as passing around drums 3 and 4 and the upper run of the belt is shown as being supported by suitable rollers 5. The drum 4 is driven in any suitable or usual way. Associated with the drum 4 is an apron 6 which rests on the endless carrier 2 and onto which the baked bread is delivered as the endless carrier passes around the driving drum 4. This apron 6 is arranged at an angle and the bread gravitates down the apron 6 and is deposited onto a delivery conveyor 7 which operates at right angles to the conveyer 2 and which carries the baked bread away from the oven.

The dough is prepared for the oven by being carried between a plurality of pairs of presser rolls which serve to roll the dough out into sheet formation. There are three such pairs of presser rolls herein shown, one pair being designated 8, 9, another 10, 11 and a third 12, 13.

14 indicates a chute by which the dough is delivered to the machine. This chute delivers the dough onto a feed belt 15 which passes around the feed roll 9 and also around a direction roll 16. The feed roll 8 is also encircled by a belt 17 which passes around and is held taut by a direction roll 19. As the dough is fed onto the endless belt 15 it is carried between the rolls 8 and 9 and receives a preliminary rolling. From these rolls the dough is delivered onto a conveyer belt 20 which carries it to the second pair of rolls 10, 11. Each of these rolls is encircled by an endless belt, said belts being indicated at 21 and 22 respectively. The belt 21 extends backwardly underneath the feed belt 20 in a downwardly-inclined direction while the belt 22 extends upwardly and forwardly from the squeeze roll 10.

23 indicates another endless conveyer situated on the other side of the rolls 10, 11 and adapted to pass the sheet of dough from the rolls 10 and 11 to the third pair of rolls 12, 13. These rolls are adjusted to give the sheet of dough the required thickness for baking operations. From these rolls 12, 13 the sheet of dough is delivered onto a conveyer belt 24 which delivers said dough onto the inlet end of the conveyer belt 2 by which the dough is carried into the oven. While the dough is being conveyed along the belt 24 it is acted on by a suitable dividing mechanism which cuts the sheet both longitudinally and transversely and which may also be constructed to score the sections thus cut both longitudinally and transversely.

The various pairs of feed rolls 8, 9, 10, 11, 12, 13 are carried by a suitable framework 25. These rolls and all the carrier belts are driven from a driving shaft 26 which extends longitudinally of the machine. This driving shaft is shown as being geared to a vertical shaft as shown at 27 and the shaft 27 may be geared by bevel gears to the shaft 29 of the drum 4 so that the power which is applied to the shaft 29 will rotate the drum 4 and also operate the driving shaft 26.

The rolls 8 and 9 are journalled in bearings or boxes 30 which are mounted in the standard 31 carried by the frame 25.

The roll 9 has rigid therewith a bevel gear 32 which meshes with a bevel gear 33 fast on an upright shaft 34 journalled in suitable bearings on the upright 31. Said shaft has a bevel gear 35 which meshes with a bevel pinion 36 fast on the shaft 26. The upper roll 8 has rigid therewith a bevel gear 37 which meshes with a bevel gear 38 also carried by the shaft 34. This bevel gear 38 is splined to the shaft 34 and it and the roll 8 are adapted to be adjusted vertically to vary the spacing between the rolls 8 and 9.

The manner of adjusting the upper roll 8 and the bevel gear 38 is or may be such as is commonly found in devices employing pressure rolls wherein one of the rolls is adjusted relative to the other. The box 30 for the upper roll and the gear 38 are connected to a sliding block 39 which can be adjusted vertically in the frame 31 by means of an adjusting screw 40. A similar construction is employed for driving and adjusting the pair of rolls 10 and 11 and also the rolls 12 and 13 and hence a description of these other adjusting devices is not necessary.

The endless apron 20 passes around two direction rolls 41, 42 and also around a drive roll 43 and a take-up roll 44. The drive roll 43 is driven from the roll 9 by means of a suitable driving belt 45. The endless apron 23 is similarly mounted and driven, it passing over two direction pulleys 41, 42 and around a driving pulley 43 which is driven from the roll 11 by a driving belt 45.

The carrier belt 24 which conveys the dough from the rolls 12, 13 to the oven passes around suitable direction rolls 46, 47, around take-up rolls 48 and around a driving roll 49 which is connected to the shaft 26 by means of bevel gears 50.

After the dough has passed through the three pairs of presser rollers above described it is delivered to the conveyor 24 in the form of a relatively thin sheet 53. As the dough passes along the conveyer 24 the edges of the sheet are trimmed to produce a sheet of a definite width and the sheet is also acted upon by a divider mechanism which divides it into units preferably rectangular in shape. The divider mechanism, which is shown best in Figs. 3 and 7, comprises a plurality of rotary cutters 51 mounted on a shaft 52 and adapted to cut the dough longitudinally along the lines 56 thereby to form strips 59. The divider mechanism also includes a transverse divider 54 in the form of a roll which is provided with one or more cutting blades 55 that are adapted to cut the sheet of dough transversely as indicated by the lines 57.

I may, if desired, place on the shaft 52 one or more marking rolls or disks 58 such as shown in Figs. 8 and 9, these disks being located between the cutting disks 51 and operating to score or mark the strips 59 as indicated at 60. The transverse dividing member 54 may also be provided with one or more scoring blades 61 which are designed to form transverse score lines 62 across the strips.

The shaft 52 is provided with a gear 63 which meshes with and is driven by a gear 64 fast on a supporting roll 65 over which the belt 24 travels, said roll 65 being geared to the shaft 26 by means of bevel gears 66.

The transverse divider 54 is shown as having a gear 67 rigid therewith which meshes with a gear 68 that is rigid with another supporting roll 69 over which the belt 24 passes and said roll 69 is connected to the shaft 26 through bevel gears 70. Associated with the cutting disk 51 and the scoring disk 58 is a doffer designed to prevent the leading edge of a sheet of dough from being lifted off the carrier 24 by the disks 51 and 58. This doffer is in the form of a plurality of doffing disks 71 fast on a shaft 72 and which is driven from the shaft 52 by means of a belt or sprocket chain 73. The shafts 52 and 72 and the shaft for the transverse divider 54 are mounted in suitable bearings 74 that are carried by a supporting frame 75.

Situated at each edge of the divider 2 is a deflector blade 81, these deflectors cooperating with the end cutters 51 to remove the edge portions 82 of the dough sheet which is trimmed off by the end cutters.

Means are provided for dusting or sifting flour onto the various feed belts and also onto the belts 17 and 22 if desired so as to prevent the dough from sticking to these belts. Any suitable form of flour sifter may be employed. In Fig. 4, one is shown in which the flour-containing chamber 76 has a perforated bottom 77, the flour being sifted through the perforations by means of a rotary brush 78 which may be driven from any suitable source of power. These flour-sifting devices may be placed in any position where it is desirable to have them.

From the above it will be seen that the rolling of the dough into the desired sheet formation and the dividing of the dough into units for baking the sheet, the conveying of the divided dough into the oven, the baking of the dough and the discharge of the dough from the oven, are all carried out automatically and without requiring any handling of the dough on the part of the operative.

I claim:

1. In a machine of the class described, the combination with an endless apron, means to deliver a sheet of dough thereto, a plurality of rotary knives situated to act on said sheet and slit the same longitudinally as it is carried along by the apron, rotary stripping members having an overlapping relation with the slitting knives, means to rotate the knives, and means to rotate the rotary stripping members in the same direction as the knives rotate, said stripping members retaining the strips into which the dough is cut on the endless conveyer.

2. In a device of the class described, the combination with an endless belt, of means to deliver a sheet of dough thereto, two parallel shafts situated above the belt, a plurality of disk knives carried by one shaft and operating to slit the dough into strips, a plurality of rotary stripper members carried by the other shaft, said shafts being spaced apart lengthwise of the belt a distance less than the combined radii of the knives and stripper members, whereby the strippers and knives overlap each other, and means to rotate said shafts in the same direction.

3. A device of the class described comprising an endless belt, means to deliver a sheet of dough to said belt, two parallel shafts situated above the belt, means to rotate the shafts in the same direction, a plurality of disk knives mounted on one shaft for slitting the dough sheet longitudinally, a plurality of toothed stripper elements mounted on the other shaft, said shafts being spaced apart a distance less than' the combined radii of the knives and stripper elements, whereby the stripper elements operate between the knives.

In testimony whereof, I have signed my name to this specification.

NAPOLEON BARMAKIAN.